United States Patent
Iwata et al.

(10) Patent No.: US 8,875,871 B2
(45) Date of Patent: Nov. 4, 2014

(54) CONVEYANCE DEVICE FOR GRANULAR MATERIALS

(75) Inventors: Morio Iwata, Shunan (JP); Hajime Takasugi, Shunan (JP); Kazunori Saeki, Shunan (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 14/115,962

(22) PCT Filed: May 31, 2012

(86) PCT No.: PCT/JP2012/064050
§ 371 (c)(1),
(2), (4) Date: Nov. 6, 2013

(87) PCT Pub. No.: WO2012/165533
PCT Pub. Date: Dec. 6, 2012

(65) Prior Publication Data
US 2014/0116848 A1     May 1, 2014

(30) Foreign Application Priority Data

Jun. 1, 2011   (JP) .................................. 2011-123668

(51) Int. Cl.
  B65G 65/46   (2006.01)
  B65G 37/00   (2006.01)
  B65G 47/19   (2006.01)
  B65G 11/20   (2006.01)
  B65G 11/08   (2006.01)

(52) U.S. Cl.
  CPC .............. *B65G 37/00* (2013.01); *B65G 11/206* (2013.01); *B65G 47/19* (2013.01); *B65G 65/46* (2013.01); *B65G 11/088* (2013.01)
  USPC ............ 198/542; 198/540; 198/547; 198/658

(58) Field of Classification Search
  USPC .......... 198/540, 542, 547, 657, 658; 193/2 R, 193/25 A, 34
  See application file for complete search history.

(56) References Cited

U.S. PATENT DOCUMENTS 3,841,851 A * 10/1974 Kaiser ............................. 48/111
4,098,200 A *  7/1978 Dauvergne .................... 110/204
(Continued)

FOREIGN PATENT DOCUMENTS

JP      9-225236     9/1997
JP     10-165734     6/1998
(Continued)

OTHER PUBLICATIONS

International Search Report Issued Sep. 4, 2012 in PCT/JP2012/064050 Filed May 31, 2012.

(Continued)

*Primary Examiner* — Douglas Hess
(74) *Attorney, Agent, or Firm* — Oblon, Spivak, McClelland, Maier & Neustadt, L.L.P.

(57) ABSTRACT

A belt conveyor, a collecting hopper and a screw conveyor are sequentially disposed below a chute for feeding hydrogenated petroleum resin pellets from a pelletizing portion. Even when the hydrogenated petroleum resin pellets fed onto the belt conveyor are dropped off or scattered, the hydrogenated petroleum resin pellets can be collected by the collecting hopper that is located below and can be securely transferred to an outside by the screw conveyor.

17 Claims, 5 Drawing Sheets

(56) References Cited

U.S. PATENT DOCUMENTS

Figure 1:
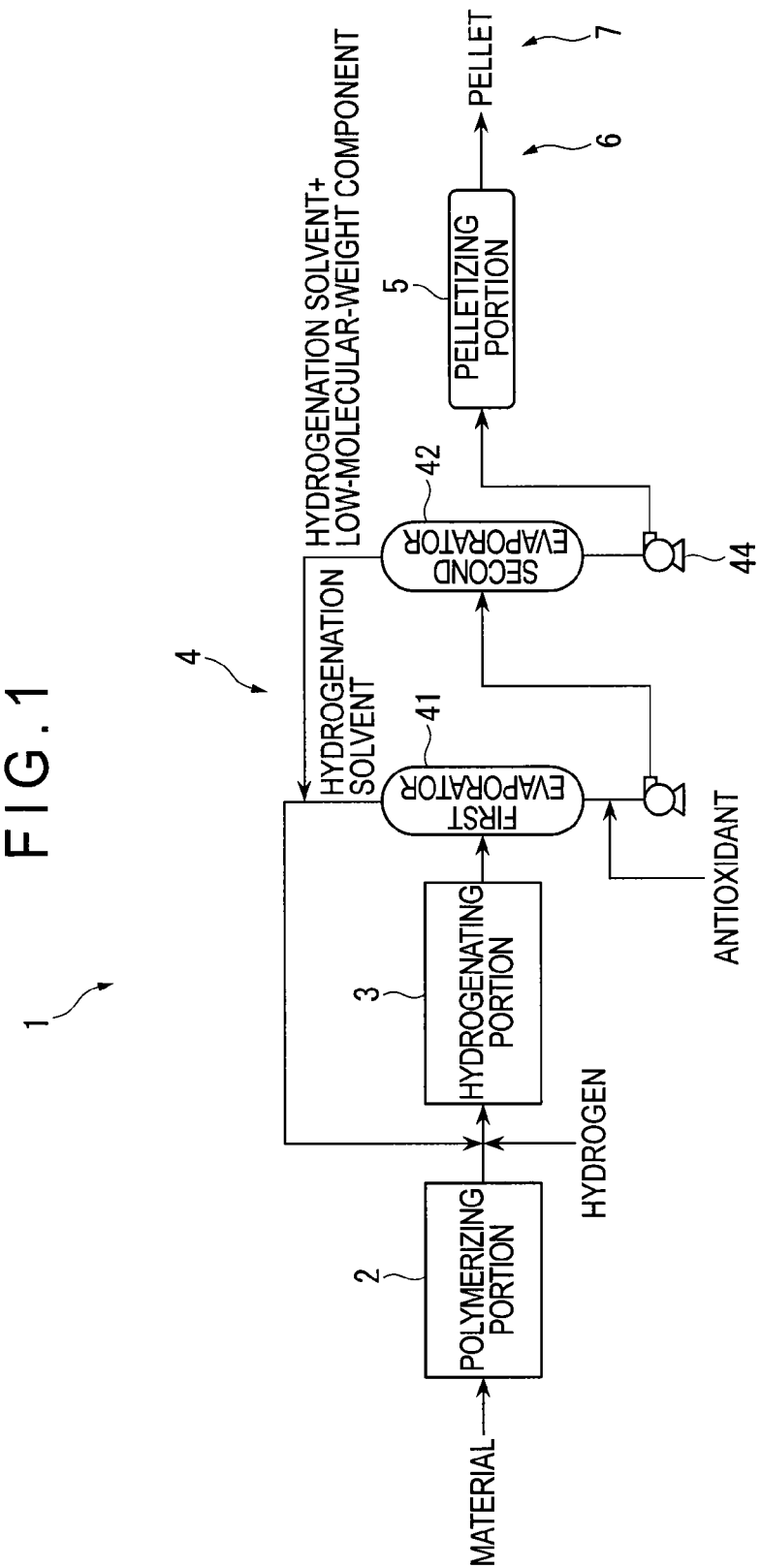

| | | | | |
|---|---|---|---|---|
| 4,119,193 A | * | 10/1978 | Smith et al. | 198/371.2 |
| 4,208,285 A | * | 6/1980 | Sample, Jr. | 210/180 |
| 4,310,089 A | * | 1/1982 | Bondeson et al. | 198/530 |
| 4,380,284 A | * | 4/1983 | Ito et al. | 198/494 |
| 4,549,698 A | * | 10/1985 | Andrews | 241/17 |
| 4,919,686 A | * | 4/1990 | Edwards | 48/197 R |
| 5,393,501 A | * | 2/1995 | Clawson et al. | 422/187 |
| 5,455,005 A | * | 10/1995 | Clawson et al. | 422/1 |
| 5,626,455 A | * | 5/1997 | Keller et al. | 414/288 |
| 6,786,943 B1 | * | 9/2004 | Jaccard et al. | 48/197 FM |
| 8,534,452 B2 | * | 9/2013 | Furuyama et al. | 198/532 |

FOREIGN PATENT DOCUMENTS

| | | |
|---|---|---|
| JP | 2001-270379 | 10/2001 |
| JP | 2002-88117 | 3/2002 |
| JP | 2003-53172 | 2/2003 |
| JP | 2003-303695 | 10/2003 |
| JP | 2004-307090 | 11/2004 |
| JP | 2005-008165 | 1/2005 |
| JP | 2010-155670 | 7/2010 |
| WO | 2004/056882 | 7/2004 |

OTHER PUBLICATIONS

U.S. Appl. No. 14/116,035, filed Nov. 6, 2013, Takasugi, et al.

U.S. Appl. No. 14/116,012, filed Nov. 6, 2013, Kashima, et al.

* cited by examiner

CONVEYANCE DEVICE FOR GRANULAR MATERIALS

TECHNICAL FIELD

The present invention relates to a transfer device for transferring a powder and granular material.

BACKGROUND ART

Hot-melt adhesives are widely used for manufacturing disposal diapers, binding books and packaging various products. Examples of the material of the hot-melt adhesives include Styrene-Butadiene-Styrene block copolymer (referred to as SBS hereinafter), Styrene-Isoprene-Styrene block copolymer (referred to as SIS hereinafter), Ethylene Vinyl Acetate block copolymer (referred to as EVA hereinafter) and Amorphous PolyAlpha-Olefin (referred to as APAO hereinafter). A tackifier in a form of a hydrogenated petroleum resin is blended in the base polymer.

The hydrogenated petroleum resin is produced by a hydrogenation process for hydrogenating a polymer obtained by adding styrene monomer to dicyclopentadiene as disclosed in Patent Literature 1, for instance. The hydrogenated petroleum resin is sometimes provided in a form of hemispherical pellets in view of handleability.

In order to pelletize the hydrogenated petroleum resin, for instance, it is possible to drop molten hydrogenated petroleum resin onto a metal cooling belt conveyor to form pellets. The cooled resin pellets are scraped off from the cooling belt conveyor with a thin-plate scraper. The scraped pellets are transferred to a hopper via another belt conveyor, a chute and the like to be put into the hopper before being kept in storage.

CITATION LIST

Patent Literature(s)

Patent Literature 1 WO2004/056882 A

SUMMARY OF THE INVENTION

Problem(s) to be Solved by the Invention

The pelletized hydrogenated petroleum resin pellets are relatively hard and brittle. Thus, when the hydrogenated petroleum resin pellets are dropped onto the belt conveyor from a pelletizer via a chute, the hydrogenated petroleum resin pellets are often damaged by an impact when being dropped, thereby generating fragments and powder. When the fragments and powder are dropped from the chute onto the belt conveyor together with the hydrogenated petroleum resin pellets, especially, the powder is scattered around to be adhered or deposited on component parts or vicinity of the belt conveyor. Thus, in order to avoid a transfer trouble of the belt conveyor due to the adhered or deposited materials, the adhered or deposited materials have to be removed.

However, since the adhered or deposited materials easily scatters in the air, the removal work environment is poor and very troublesome work is required.

An object of the invention is to provide a transfer device of a powder and granular material that is capable of facilitating maintenance and stably transferring a powder and granular material for a long time.

Means for Solving the Problem(s)

A transfer device of a powder and granular material according to an aspect of the invention includes: a chute that feeds the powder and granular material; a first conveyor in a form of a belt conveyor or a bucket conveyor; a hopper; and a second conveyor, the first conveyor, the hopper and the second conveyor being sequentially disposed below the chute.

According to the above aspect of the invention, the powder and granular material fed from the chute is dropped onto the first conveyor in the form of a belt conveyor or a bucket conveyor disposed below to be transferred. The powder and granular material that is dropped off from the first conveyor or scattered when being dropped onto the first conveyor is collected by the hopper disposed further below and is transferred by the second conveyor disposed further below the bottom of the hopper. Thus, an interference on the first conveyor due to the deposition of the powder and granular material that is dropped off from the chute or scattered can be avoided, so that the powder and granular material can be stably transferred for a long time.

The transfer device according the above aspect of the invention preferably includes a dome-shaped member disposed above the first conveyor and covers the first conveyor.

According to the above arrangement, the dome-shaped member prevents the powder and granular material fed on the first conveyor from bouncing and scattering therearound, thereby improving the transfer environment.

In the above aspect of the invention, the second conveyor is preferably a screw conveyor.

According to the above arrangement, the powder and granular material collected by the hopper is securely transferred by the second conveyor in the form of a screw conveyor without falling out of the second conveyor. Consequently, the work for removing the powder and granular material dropped off the first conveyor or deposited after once being scattered can be significantly reduced, thereby extremely facilitating the maintenance work.

According to the above aspect of the invention, the hopper is preferably provided below at least a feed position of a granular material from the chute to the first conveyor.

According to the above arrangement, the hopper is provided below the region at which the powder and granular material fed onto the first conveyor is bounced or scattered to collect the bounced or scattered powder and granular material. Accordingly, the powder and granular material dropped off the first conveyor can be efficiently collected with a requisite minimum structure.

According to the above aspect of the invention, an air-suction unit provided to the first conveyor in a vicinity of a position at which the powder and granular material is fed from the chute is preferably provided.

According to the above arrangement, even when the powder and granular material is scattered when being dropped onto the first conveyor, the scattered powder and granular material is sucked by the air-suction unit, so that the transfer trouble due to adhered powder on the first conveyor can be avoided. In addition, an increase in the concentration of the powder and granular material (e.g. explosive dust) can be avoided, so that stable transfer can be achieved.

In the above aspect of the invention, an inclination angle of an inner surface of the hopper is preferably larger than a repose angle of the powder and granular material.

According to the above arrangement, the deposition of the powder and granular material on the inner surface of the hopper can be avoided, whereby, when the powder and granular material of a different product is fed from the chute, it does not occur that the deposited powder and granular material falls together with the powder and granular material of the different product to be mixed therewith.

In the above aspect of the invention, the chute, the first conveyor, the hopper and the second conveyor are preferably grounded.

According to the above arrangement, the dust explosion resulting from an electrostatic discharge can be avoided and a stable transfer can be achieved.

In the above aspect of the invention, the powder and granular material is preferably a pelletized hydrogenated petroleum resin.

According to the above arrangement, the powder and granular material in the form of the pelletized hydrogenated petroleum resin including hydrogenated petroleum resin pellets (granular material that is likely to be damaged due to an impact during the pelletizing process or during the travel in the chute after being pelletized) is not deposited in the vicinity of the first conveyor not to interfere with the drive of the first conveyor, whereby the powder and granular material can be stably transferred for a long time.

BRIEF DESCRIPTION OF DRAWING(S)

FIG. 1 is a block diagram schematically showing an arrangement of a production plant of hydrogenated petroleum resin pellets using a transfer device of a granular material according to an exemplary embodiment of the invention.

Figure 2:
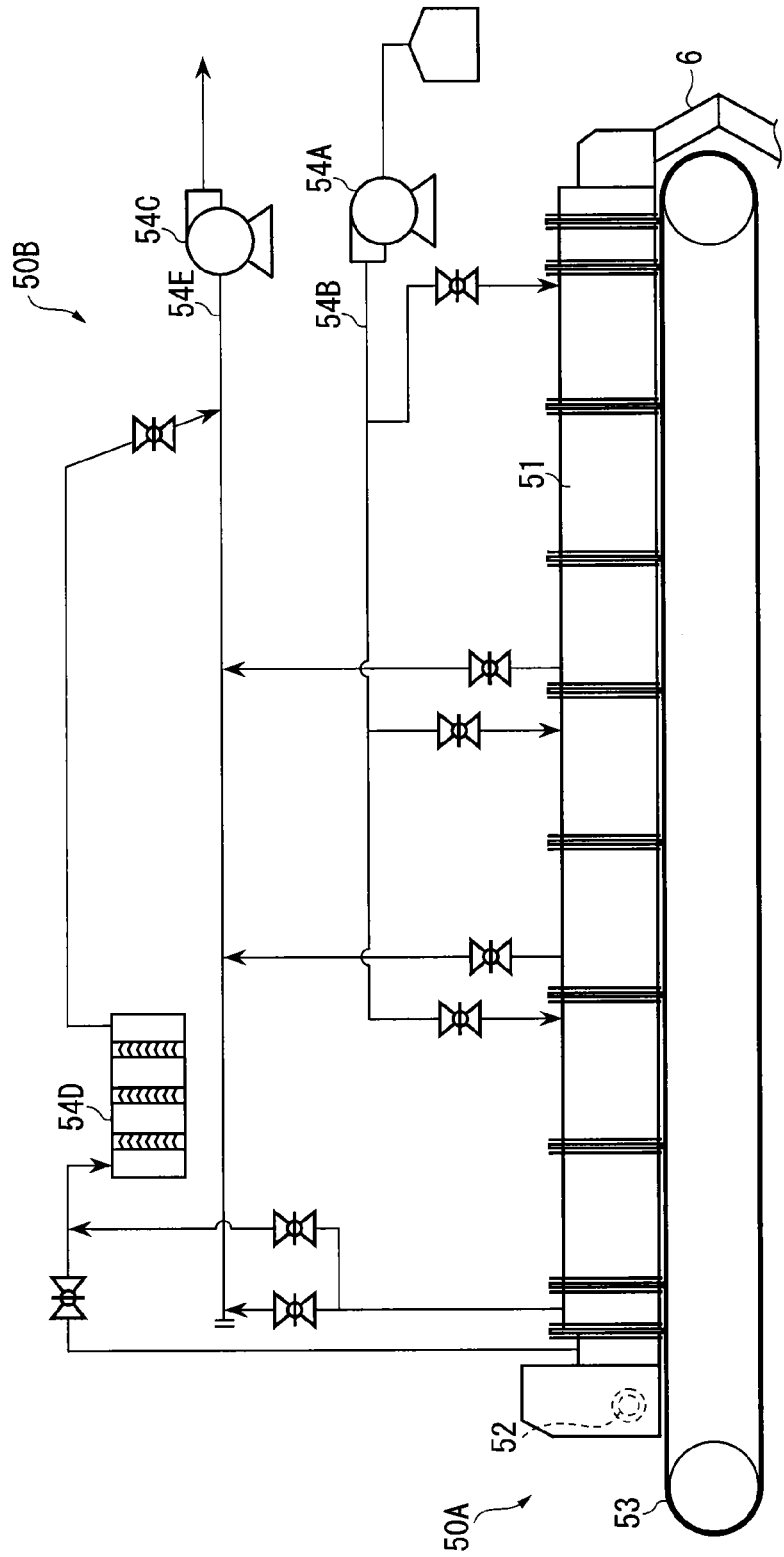

FIG. 2 schematically shows a pelletizing portion in the production plant of the hydrogenated petroleum resin pellets.

Figure 3:
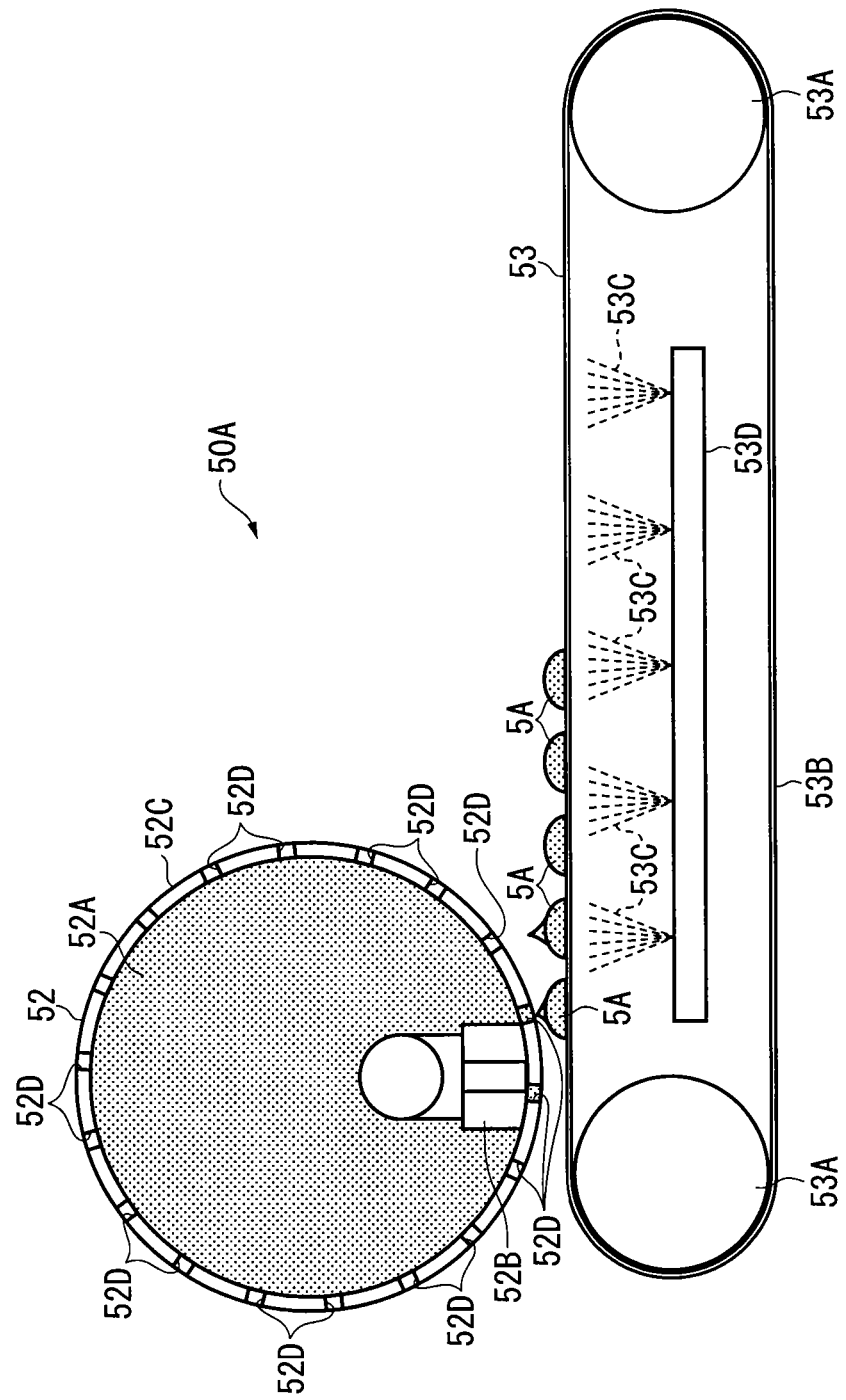

FIG. 3 schematically shows a pelletizion process in the pelletizing portion.

Figure 4:
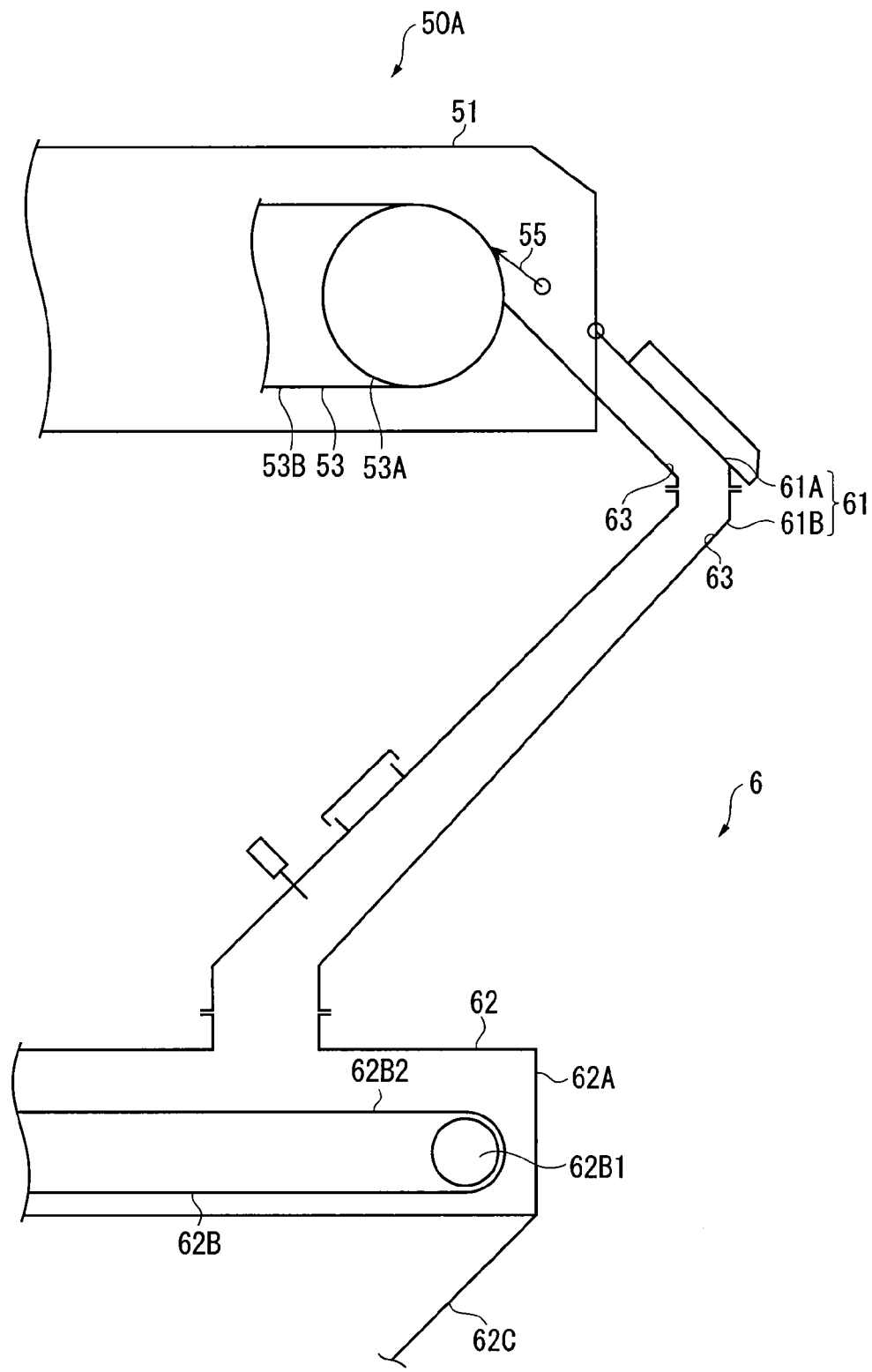

FIG. 4 schematically shows a transferring portion in the production plant of the hydrogenated petroleum resin pellets.

Figure 5:
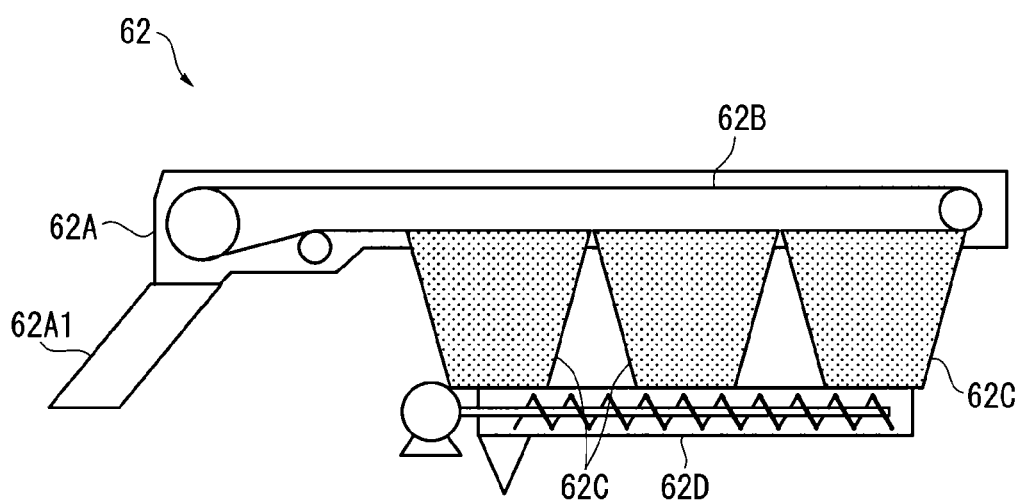

FIG. 5 schematically shows a transfer conveyor in the transferring portion.

DESCRIPTION OF EMBODIMENT(S)

As a transfer device of pelletized products of the invention, an exemplary embodiment related to a transfer device of hydrogenated petroleum resin pellets will be described below with reference to the attached drawings.

The powder and granular material in a form of hydrogenated petroleum resin pellets will be exemplified in the invention. However, the invention is also applicable to various powder and granular materials, especially to granular substances easily damaged due to collision or to a combination of the granular substances and powder. The powder and granular material includes pellets and/or fragments, granules or powder of the pellets.

Initially, an arrangement of a production plant provided with the transfer device of the hydrogenated petroleum resin pellets for producing the hydrogenated petroleum resin pellets will be described below.

Arrangement of Production Plant of Hydrogenated Petroleum Resin Pellets

As shown in FIG. 1, a production plant 1 for hydrogenated petroleum resin pellets is a plant for producing hydrogenated petroleum resin pellets from a hydrogenated petroleum resin material.

The production plant 1 includes: a polymerizing portion 2; a hydrogenating portion 3; a hydrogenation solvent recovering portion 4; a pelletizing portion 5; a transferring portion 6; a storage portion 7; and a control portion (not shown).

Polymerization Reaction

The polymerizing portion 2 performs a polymerization reaction in which a cyclopentadiene compound and a vinyl aromatics are thermally polymerized to produce a copolymer.

The polymerizing portion 2 is provided with, for instance, a polymerization reaction vessel in which the hydrogenated petroleum resin materials in a form of the cyclopentadiene compound and the vinyl aromatics are thermally polymerized using a solvent.

Examples of the cyclopentadiene compound include cyclopentadiene, methylcyclopentadiene, ethylcyclopentadiene, dimmer thereof and co-dimers thereof.

Examples of the vinyl aromatics include styrene, á-methylstyrene and vinyl toluene.

Examples of the solvent include an aromatic solvent, naphthene solvent and aliphatic hydrocarbon solvent. Specifically, benzene, toluene, xylene, cyclohexane, methylcyclohexane, dimethylcyclohexane and ethylcyclohexane are suitably usable. The solvent is recovered as necessary from the polymerization reaction vessel to be recycled.

The recovered solvent typically contains a low-molecular-weight component with a molecular weight approximately in a range from 250 to 300.

In order to avoid degradation of the physical properties, the concentration of the low-molecular-weight component is at least set at 4 mass % or less when the solvent is recycled for the thermal polymerization. According to the content of the low-molecular-weight component in the recovered solvent, the low-molecular-weight component is further separately removed or the solvent is diluted with a new solvent so that the concentration of the low-molecular-weight component falls at 4 mass % or below before being used as the polymerization solvent at the start of the polymerization reaction.

The polymerization reaction vessel is a reactor for performing the polymerization in a pressurized and heated environment. The polymerization reaction vessel includes an agitator and a heater (both not shown). A first material vessel, a second material vessel and a solvent vessel of the solvent recovering portion are connected to the polymerization reaction vessel, whereby the cyclopentadiene compound, the vinyl aromatics and the solvent are put into the polymerization reaction vessel as needed. The obtained copolymer flows out through the bottom of the polymerization reaction vessel to be subjected to the subsequent hydrogenation reaction.

Herein, though the mixture ratio of the cyclopentadiene compound and the vinyl aromatics is not particularly limited, a typical ratio (the cyclopentadiene compound:the vinyl aromatics) is in a range from 70:30 to 20:80.

Further, the used amount of the polymerization solvent is in a range from 50 to 500 parts by mass relative to 100 parts by mass of a mixture of the monomers.

At the start of the thermal polymerization, it is desirable that the temperature of the solvent is heated to 100 degrees C. or more, preferably 150 degrees C. or more in the polymerization reaction vessel. The mixture of the cyclopentadiene compound and the vinyl aromatics is added in a divided manner into the heated solvent in the polymerization reaction vessel for copolymerization.

The time for adding the mixture in a divided manner is typically in a range from 0.5 to 5 hours. It is desirable that the mixture is added in equal parts. The copolymerization reaction desirably continues after the addition of the mixture of the cyclopentadiene compound and the vinyl aromatics is completed. Though the reaction conditions at this time are not specifically limited, the typical reaction temperature is in a range from 150 to 350 degrees C., the typical reaction pressure is in a range from 0 to 2 MPa and the typical reaction time is in a range from 1 to 10 hours.

After the thermal polymerization in the polymerization reaction vessel according to the above conditions, a copolymer having a softening point in a range from 60 to 130 degrees C., a content of the vinyl aromatics in a range from 30 to 90 mass %, a bromine number in a range from 30 to 90 g/100 g and a number average molecular weight in a range from 400 to 1000 is obtained.

Hydrogenation Reaction

In the hydrogenating portion 3, a hydrogenation reaction for adding hydrogen to the copolymer generated by the thermal polymerization in the polymerizing portion 2 to obtain a hydrogenated product is performed.

The hydrogenating portion 3 includes a plurality of hydrogenation reactors for performing the hydrogenation reaction for adding hydrogen to the copolymer generated by the thermal polymerization in the polymerizing portion 2 under the presence of the hydrogenation solvent, and the like.

Examples of the hydrogenation solvent are cyclohexane, methylcyclohexane, dimethylcyclohexane, ethylcyclohexane and tetrahydrofuran.

A hydrogenation catalyst is fed in each of the hydrogenation reactors. The hydrogenation reactors may be used in multiple stages. A nickel catalyst, palladium catalyst, cobalt catalyst, platinum catalyst, rhodium catalyst and the like are used for the hydrogenation catalyst. Under the presence of the hydrogenation catalyst, hydrogen and the copolymer are subjected to a hydrogenation reaction at a temperature in a range from 120 to 300 degrees C. and a reaction pressure in a range from 1 to 6 MPa and for a reaction time in a range from 1 to 7 hours.

A hydrogenated product having a softening point in a range from 70 to 140 degrees C., a content of the vinyl aromatics in a range from 0 to 35 mass %, a bromine number in a range from 0 to 30 g/100 g and a number average molecular weight in a range from 400 to 1000 is obtained according to the above hydrogenation conditions.

In the hydrogenating portion 3, gas phase component including unreacted hydrogen is separated to be recovered after the hydrogenation by the hydrogenation reactors and is subjected to a process outside the system.

Hydrogenation Solvent Removal

The hydrogenation solvent recovering portion 4 separates and removes the hydrogenation solvent from the hydrogenated product. The hydrogenation solvent recovering portion 4 includes a solvent evaporation vessel 41 (first evaporator), a thin-film evaporator 42 (second evaporator) and the like.

The solvent evaporation vessel 41 is connected to the hydrogenating portion 3. The solvent evaporation vessel 41 separates and recovers the hydrogenation solvent by evaporation from the hydrogenated product obtained in the hydrogenating portion 3. The evaporated hydrogenation solvent is separately recovered and is recycled as the hydrogenation solvent used during the hydrogenation reaction in the hydrogenating portion 3.

The thin-film evaporator 42 is connected to the solvent evaporation vessel 41. The thin-film evaporator 42 separates and recovers the hydrogenation solvent remained in the hydrogenated product by evaporation. The evaporated hydrogenation solvent and the low-molecular-weight component are separately recovered and are recycled as a hydrogenation solvent used during the hydrogenation reaction in the hydrogenating portion 3 according to the values of the physical properties of the hydrogenated petroleum resin pellets to be produced (target hydrogenated petroleum resin).

An adding portion for adding an antioxidant is provided between the solvent evaporation vessel 41 and the thin-film evaporator 42 of the hydrogenation solvent recovering portion 4.

The adding portion of the antioxidant adds an antioxidant to the hydrogenated product from which most of the hydrogenation solvent is removed in the solvent evaporation vessel 41.

The hydrogenation solvent separated and recovered in the evaporation process in the downstream thin-film evaporator 42 from the hydrogenation solvent remained together with the solvent in which the antioxidant is dissolved can be recycled for the hydrogenation reaction so that the hydrogenation reaction is not influenced thereby.

The solvent in which the antioxidant is dissolved is separated and recovered from the hydrogenated product together with the hydrogenation solvent by the downstream thin-film evaporator 42.

Pelletizing

The pelletizing portion 5 forms the molten resin (i.e. the hydrogenated product from which the hydrogenation solvent is removed and to which the antioxidant is added) into hydrogenated petroleum resin pellets.

Specifically, as shown in FIG. 2, the pelletizing portion 5 includes a pelletizer 50A and a pellet-air-cooling unit 50B.

As shown in FIG. 3, the pelletizer 50A includes a pelletizer body 52 and a cooling conveyor 53.

The pelletizer body 52 is disposed in a pelletizing case 51 in a manner to face an upstream end of the cooling conveyor 53 in a transfer direction. The pelletizer body 52 includes a trunk 52A having a cylindrical heating portion (not shown) and a die 52B that axially discharges a molten resin from an outer circumferential surface of the trunk 52A.

Further, the pelletizer body 52 includes a cylindrical rotary body 52C that is rotatably fitted to the outer circumferential surface of the trunk 52A. The rotary body 52C has a plurality of discharge holes 52D in a pattern of a perforated metal. When the outer circumferential surface of the trunk 52A is rotated to position the discharge holes 52D to the die 52B, a predetermined amount of the molten resin 5A is discharged on the cooling conveyor 53.

The cooling conveyor 53, which is disposed in the pelletizing case 51, includes a pair of pulleys 53A and a metallic belt 53B (a metallic endless belt) that is rotatably wound around the pulleys 53A.

Further, the cooling conveyor 53 includes a cooling portion 53D that ejects cooling water 53C toward a backside of the metallic belt 53B to cool the metallic belt 53B. It should be noted that the metallic belt 53B is not necessarily cooled by ejecting the cooling water 53C, but may be cooled by any method (e.g., spraying of cool air).

As shown in FIG. 2, the pellet-air-cooling portion 50B includes: an air intake 54B having an air-feeding blower 54A that introduces air to the pelletizing case 51; and an exhaust duct 54E having a filter 54D and an intake blower 54C that sucks air within the pelletizing case 51.

The air intake 54B is provided so as to introduce air into the pelletizing case 51 at positions corresponding to a downstream end and two middle positions of the cooling conveyor 53.

The exhaust duct 54E is provided so as to suck air in the pelletizing case 51 at positions corresponding to three positions near the pelletizer body 52 at the upstream end of the cooling conveyor 53 and two positions in the middle in the transfer direction of the cooling conveyor 53, in other words, in a range until the molten resin dropped on the cooling conveyor 53 is solidified. In the exhaust duct 54E, the filter 54D captures and removes low-molecular-weight component mist from air containing the low-molecular-weight component mist in the pelletizing case 51, so that only air is exhausted.

Intake and exhaust of air in the middle positions are suitably designed according to different softening points of to-be-produced hydrogenated petroleum resin pellets. Specifically, a structure allowing intake and exhaust of air at a plurality of positions is preferable so as to cope with a case where the range until the molten resin is solidified differs depending on products.

As the filter 54D, an inertial collision filter, a blocking filter, an electrostatic adsorption filter, a Brownian diffusion filter and the like are used, among which a glass fiber filter is preferable. Specifically, since the low-molecular-weight component mist is formed of highly viscous microparticles having a mist diameter of 1 μm or less, the glass fiber filter that provides an effect to capture particles having an ignorable mass (i.e., capture effect by Brownian diffusion) in addition to the inertial collision effect is preferable A pressure loss of the filter 54D is preferably set in a range of 0.5 kPa to 2.5 kPa in view of a relationship with a filtration area.

As shown in FIG. 4, a scraper 55 that scrapes the hydrogenated petroleum resin pellets solidified on the metallic belt is disposed at the downstream end of the cooling conveyor 53 in the pelletizing case 51.

Further, a transfer portion 6 that is positioned at the downstream end of the cooling conveyor 53 and transfers the hydrogenated petroleum resin pellets to the storage portion 7 is connected to the pelletizing case 51.

Transfer

The transfer portion 6 transfers the hydrogenated petroleum resin pellets produced in the pelletizing portion 5 to the storage portion 7.

As shown in FIG. 4, the transfer portion 6 includes: a chute 61 connected to the pelletizing portion 5; a transfer conveyor 62 connected to the chute 61; and a bucket conveyor (not shown).

The chute 61 includes: an upper chute 61A of which one end is connected to a lower part of the pelletizing case 51 at the downstream end of the cooling conveyor 53 and the other end extends downward; and a lower chute 61B of which one end is connected to a lower end of the upper chute 61A and the other end extends opposed to the upper chute 61A. The chute 61 is formed in a V-shape in a lateral view.

The upper chute 61A and the lower chute 61B are provided such that an inclined surface 63 on which the hydrogenated petroleum resin pellets flow is inclined at an inclination angle in a range of 44 degrees to 75 degrees relative to the horizontal surface.

Herein, when the inclination angle of the inclined surface 63 is less than 44 degrees, the hydrogenated petroleum resin pellets remain on the inclined surface 63. When the product to be produced is changed, the remaining hydrogenated petroleum resin pellets may be mixed with the newly produced product. On the other hand, when the inclination angle of the inclined surface 63 is sharp (i.e. more than 75 degrees), the flow speed of the hydrogenated petroleum resin pellets flowing on the inclined surface 63 is increased, which may break the hydrogenated petroleum resin pellets due to impact of the flow. Herein, the flow speed of the hydrogenated petroleum resin pellets is preferably 1.98 m/s or less.

As shown in FIG. 5, the transfer conveyor 62 includes: a conveyor case 62A (dome-shaped member); a belt conveyor 62B (first conveyor); a collecting hopper 62C (hopper); and a screw conveyor 62D (second conveyor).

The belt conveyor 62B, the collecting hopper 62C and the screw conveyor 62D of the transfer conveyor 62 are sequentially disposed below the chute 61.

The belt conveyor 62B is disposed in the conveyor case 62A to which the lower end of the lower chute 61B is connected and transfers the hydrogenated petroleum resin pellets having flowed through the lower chute 61B. Specifically, the conveyor case 62A covers an upper side of the belt conveyor 62B. The belt conveyor 62B includes a pair of transfer pulleys 62B1 and an endless belt 62B2 that is rotatably wound around the transfer pulleys 62B1.

At the other end of the conveyor case 62A, a loading chute 62A1 for loading the hydrogenated petroleum resin pellets transferred by the belt conveyor 62B to the storage portion 7 is provided. A bucket conveyor that transfers the hydrogenated petroleum resin pellets to the storage portion 7 is connected to the loading chute 62A1.

The conveyor case 62A and the belt conveyor 62B are grounded.

The collecting hopper 62C is opened with a diameter thereof being enlarged upward and includes a plurality of collecting hoppers 62C provided to a lower surface of the conveyor case 62A under the belt conveyor 62B. An inner surface of the collecting hopper 62C is formed to be inclined at an angle larger than the repose angle at which the powdery hydrogenated petroleum resin pellets slip down, specifically at the angle of 70 degrees or more relative to the horizontal surface. The plurality of collecting hoppers 62C are not necessarily provided. Only a single collecting hopper 62C may be provided as long as the collecting hopper 62C is provided under the lower chute 61B and can collect the hydrogenated petroleum resin pellets overflowing the belt conveyor 62B after flowing through the lower chute 61B.

The screw conveyor 62D is provided to a lower side of the plurality of collecting hoppers 62C to transfer the hydrogenated petroleum resin pellets or the powder and granular material thereof collected by each of the collecting hoppers 62C to an outside of the collecting hoppers 62C.

The collecting hopper 62C and the screw conveyor 62D are also grounded.

An air-suction unit (not shown) for sucking air to an inside of the conveyor case 62A at least from a portion near the lower chute 61B is provided to the transfer conveyor 62.

The suction unit includes a blower and a filter (e.g. bag filter) as in, for instance, the pellet-air-cooling unit 54 of the pelletizing portion 5. The suction unit may be designed in various manners as long as the suction unit sucks the powder of the hydrogenated petroleum resin scattered when the hydrogenated petroleum resin pellets are fed from the chute 61 onto the belt conveyor 62B and captures the powder by a filter.

Storage

The storage portion 7 stores the hydrogenated petroleum resin pellets transferred by the transferring portion 6 in a manner so that the pellets are capable of being taken out.

The storage portion 7 includes storage hopper(s) (not shown) and a switching portion (not shown) for loading the hydrogenated petroleum resin pellets transferred by the bucket conveyor of the transferring portion 6 to a predetermined one of the storage hopper(s).

Advantage(s) of Embodiment(s)

In the exemplary embodiment as described above, the belt conveyor 62B, the collecting hopper 62C and the screw conveyor 62D are sequentially disposed below the chute 61 for feeding the hydrogenated petroleum resin pellets from the pelletizing portion 5.

Thus, the hydrogenated petroleum resin pellets fed from the chute 61 are dropped onto the belt conveyor 62B disposed below to be transferred. The hydrogenated petroleum resin pellets dropped off the belt conveyor 62B and powder of the hydrogenated petroleum resin scattered to be fallen outside the belt conveyor 62B when the pellets and powders are dropped on the belt conveyor 62B are collected by the collecting hopper 62C that is located below the belt conveyor 62B. The hydrogenated petroleum resin pellets and the powder collected by the collecting hopper 62C are transferred through the bottom of the collecting hopper 62C to an outside by the screw conveyor 62D located below the collecting hopper 62C.

Thus, the powder and granular materials of the hydrogenated petroleum resin fed by the chute 61 and dropped or scattered out of the belt conveyor 62B are kept from being deposited on or in the vicinity of the belt conveyor 62B to interfere with the drive of the belt conveyor 62B. Thus, the hydrogenated petroleum resin pellets can be stably transferred for a long time.

In the above exemplary embodiment, the dome-shaped conveyor case 62A disposed above to cover the belt conveyor 62B is provided.

The conveyor case 62A prevents the hydrogenated petroleum resin pellets fed on the belt conveyor 62B from bouncing and scattering therearound, thereby improving the transfer environment.

In the above exemplary embodiment, the hydrogenated petroleum resin pellets collected by the collecting hopper 62C are transferred by the screw conveyor 62D.

Accordingly, the collected hydrogenated petroleum resin pellets can be securely transferred by the screw conveyor 62D without being dropped. Consequently, the work for removing the hydrogenated petroleum resin pellets and the powder dropped off the belt conveyor 62B or deposited after once being scattered can be significantly reduced, thereby extremely facilitating the maintenance work.

In the above exemplary embodiment, the collecting hopper 62C is provided at least below the feed position at which the hydrogenated petroleum resin pellets fed from the chute 61 onto the belt conveyor 62B are bounced or the powder is scattered.

Accordingly, the hydrogenated petroleum resin pellets or the powder dropped off the belt conveyor 62B can be efficiently collected with a requisite minimum structure.

In the above exemplary embodiment, the air-suction unit is provided in the vicinity of the position at which the hydrogenated petroleum resin pellets are fed from the chute 61 onto the belt conveyor 62B.

Accordingly, even when the powder is scattered when the pellets are fed onto the belt conveyor 62B, the powder is sucked and captured by the air-suction unit. Thus, the powder of the hydrogenated petroleum resin is kept from being adhered on the belt conveyor 62B, thereby preventing the drive of the belt conveyor 62B from being unstable to cause transfer trouble and allowing a stable transfer for a long time. In addition, the increase in the concentration of the powder within the conveyor case 62A can be avoided, so that dust explosion can be avoided and stable transfer can be achieved.

In the above exemplary embodiment, the inclination angle of the inner surface of the collecting hopper 62C is designed to be larger than the repose angle of the hydrogenated petroleum resin pellets and the powder.

Thus, the deposition of the hydrogenated petroleum resin pellets and the powder on the inner surface of the collecting hopper 62C can be avoided, whereby, when the powder and granular material of a different product is fed from the chute 61, it does not occur that the powder and granular material of the different product falls to be mixed with the powder and granular material fed before and deposited.

In the above exemplary embodiment, the chute 61, the belt conveyor 62B, the collecting hopper 62C and the screw conveyor 62D are respectively grounded.

Accordingly, a dust explosion resulting from an electrostatic discharge can be avoided and a stable transfer can be achieved.

The above exemplary embodiment is directed to transferring the hydrogenated petroleum resin pellets that are likely to be damaged due to an impact during production or after the production while flowing in the chute 61 and are likely to generate powder and granular material (e.g. fragments and powder).

Accordingly, even with the pelletized hydrogenated petroleum resin including the hydrogenated petroleum resin pellets, the hydrogenated petroleum resin pellets and the powder and granular material are kept from depositing around the belt conveyor 62B to interfere with the drive of the belt conveyor 62B. Thus, the transfer operation can be stably performed for a long time while hardly requiring scraping of the deposited material, so that the maintenance work can be facilitated.

Modification(s)

Incidentally, it should be understood that the scope of the present invention is not limited to the above-described exemplary embodiment(s) but includes modifications and improvements as long as the modifications and improvements are compatible with the invention.

Though the transfer of the hydrogenated petroleum resin pellets that are easily damaged is exemplarily described, the transfer target is not only the hydrogenated petroleum resin pellets but also any one of powder and granular materials including the granular material bounced when being fed onto the belt conveyor 62B or the bucket conveyor, the powder scattering when being fed and the mixture thereof (i.e. the powder and granular material) that is likely to be dropped off a conveyor when being transferred.

The chute 61 for feeding the hydrogenated petroleum resin pellets from the pelletizing portion 5 does not necessarily have the arrangement in the above exemplary embodiment, but any chute having a structure that is capable of feeding the powder and granular material onto the belt conveyor 62B or the bucket conveyor is usable.

Though the belt conveyor 62B is exemplarily used as the conveyor on which the hydrogenated petroleum resin pellets are fed from the chute 61, a bucket conveyor may alternatively be used.

Though the collected powder and granular material is exemplarily transferred by the screw conveyor 62D, various conveyors other than the screw conveyor 62D such as the belt conveyor 62B and bucket conveyor may alternatively be used.

The configuration of the collecting hopper 62C may be designed in any manner as long as the powder and granular material dropped off from the belt conveyor 62B or the bucket conveyor can be collected.

The conveyor case 62A that is disposed above to cover the belt conveyor 62B is also designed in any manner as long as the conveyor case 62A can prevent bouncing and scattering of the powder and granular material fed onto the belt conveyor 62B. Further alternatively, the conveyor case 62A is not necessarily provided.

The air-suction unit provided to the transfer conveyor 62 is also designed in any manner as long as the (especially scattering) powder and granular material can be sucked. Further alternatively, the air-suction unit is not necessarily be provided.

When a powder and granular material unlikely to generate static electricity or a powder and granular material that does not cause dust explosion is used, the device is not necessarily be grounded.

Other specific structure and process in implementing the invention may be altered otherwise as long as the structure and the process are compatible with the invention.

The invention claimed is:

1. A transfer device, comprising:
   a chute adapted to feed a powder and granular material;
   a first conveyor in a form of a belt conveyor or a bucket conveyor, the first conveyor being provided below the chute and transferring the fed powder and granular material;
   a hopper that is provided below the first conveyor and collects the powder and granular material dropped off from the first conveyor or scattered when being dropped onto the first conveyor; and
   a second conveyor that is provided at a bottom of the hopper and transfers the powder and granular material collected by the hopper outside of the hopper.

2. The transfer device according to claim 1, further comprising:
   a dome-shaped member disposed above the first conveyor, wherein the member covers the first conveyor.

3. The transfer device according to claim 1, wherein the second conveyor is a screw conveyor.

4. The transfer device according to claim 1, wherein the hopper is below at least a feed position of the powder and granular material from the chute to the first conveyor.

5. The transfer device according to claim 4, further comprising:
   an air-suction unit disposed to the first conveyor in a vicinity of a position at which the powder and granular material is fed from the chute.

6. The transfer device according to claim 1, wherein an inclination angle of an inner surface of the hopper is larger than a repose angle of the powder and granular material.

7. The transfer device according to claim 1, wherein the chute, the first conveyor, the hopper and the second conveyor are grounded.

8. The transfer device according to claim 1, wherein the powder and granular material comprises pellets and/or fragments, granules or power of the pellets of a hydrogenated petroleum resin.

9. A transfer device comprising:
   a chute configured to feed a powder and granular material onto a first conveyor;
   a first conveyor in a form of a belt conveyor or a bucket conveyor operably positioned below the chute to receive the powder and granular material deposited on the first conveyor and transfer them to a loading chute or a storage portion;
   one or more hopper(s) operably positioned below the first conveyor to collect the powder and granular material that overflow or drop off of the first conveyor; and
   a second conveyor operably positioned at a bottom of the one or more hopper(s) to transfer the powder and granular material collected in the at least one hopper(s) outside of the hopper(s).

10. The transfer device of claim 9, further comprising a dome-shaped member disposed above the first conveyor, wherein the member covers the first conveyor.

11. The transfer device of claim 9, wherein the second conveyor is a screw conveyor.

12. The transfer device of claim 9, further comprising an air-suction unit disposed to the first conveyor in a vicinity of a position at which the powder and granular material is fed from the chute.

13. The transfer device of claim 9 which is configured to receive, transfer and collect a deposited material that comprises the powder and granular material of a hydrogenated petroleum resin.

14. A plant for producing hydrogenated petroleum resin pellets comprising means for producing hydrogenated petroleum pellets and the transfer device of claim 9.

15. The transfer device of claim 9, further comprising a material in the form of pellets and/or fragments, granules, or powder of the pellets.

16. A method for transferring a powder and granular material to a storage portion and separately transferring the powder and granular material that falls off a first conveyor to a hopper comprising:
   depositing the powder and granular material into the chute of the transfer device of claim 9 and
   transferring the powder and granular material falling on the first conveyor to a storage portion via the first conveyor and separately transferring the powder and granular material falling off the first conveyor into the one or more hopper(s).

17. The method of claim 16, wherein said powder and granular material is a hydrogenated petroleum resin.

* * * * *